United States Patent [19]

Kato

[11] Patent Number: 5,797,378

[45] Date of Patent: Aug. 25, 1998

[54] FUEL SUPPLY SYSTEM

[75] Inventor: Masahiko Kato, Hamamatsu, Japan

[73] Assignee: Sanshin Kogyo Kabushiki Kaisha, Shizuoka, Japan

[21] Appl. No.: 757,193

[22] Filed: Nov. 27, 1996

[30] Foreign Application Priority Data

Nov. 27, 1995 [JP] Japan .................. 7-307698

[51] Int. Cl.⁶ .................................. F02M 37/04
[52] U.S. Cl. .......................... 123/516; 123/198 E
[58] Field of Search ................ 123/516, 198 E, 123/195 P, 540

[56] References Cited

U.S. PATENT DOCUMENTS

| | | | |
|---|---|---|---|
| 5,103,793 | 4/1992 | Riese et al. | 123/516 |
| 5,309,885 | 5/1994 | Rawlings et al. | 123/509 |
| 5,389,245 | 2/1995 | Jaeger et al. | 123/516 |
| 5,425,336 | 6/1995 | Nakayama | 123/198 R |
| 5,501,202 | 3/1996 | Watanabe | 123/509 |

*Primary Examiner*—Thomas N. Moulis
*Attorney, Agent, or Firm*—Knobbe, Martens, Olson & Bear, LLP

[57] ABSTRACT

An outboard motor includes a powerhead with an internal combustion engine and a protective cowling which surrounds the engine. A fuel supply system is carried by the outboard motor and delivers fuel to the engine. A cooling system is provided for the fuel supply system for removing heat from at least a portion of the fuel supply system so that gaseous bubble formation in the fuel of the fuel supply system is inhibited.

11 Claims, 7 Drawing Sheets

FUEL SUPPLY SYSTEM

BACKGROUND OF THE INVENTION

1. Field of the Invention

The present invention relates in general to an internal combustion engine and in particular to a fuel supply system of an internal combustion engine.

2. Description of Related Art

It is desirable in a power head of an outboard motor to reduce the size and shape of the power head to reduce the amount of drag that the power head produces as the associated watercraft travels across the water. The power head of an outboard motor generally extends above the transom of the watercraft. Consequently, the power head produces an aerodynamic drag on the watercraft as the watercraft speeds over the water. The size and shape of the power head directly affects the amount of drag produced.

One way to reduce the size and shape of the power head is to reduce the amount of space that the components of the fuel supply system occupy. The fuel supply system of an outboard motor typically includes a vapor separator and a high-pressure fuel pump. The vapor separator acts to separate fuel vapors from liquid fuel before the high-pressure fuel pump delivers the liquid fuel to a plurality of fuel injectors. Until recently, the high-pressure fuel pump was provided outside of the vapor separator. However, in an effort to reduce the amount of space that the fuel supply system occupies and, thus, the size of the powerhead, the high-pressure fuel pump was provided inside of the vapor separator.

Although providing the high-pressure fuel pump inside the vapor separator reduces the size of the fuel supply system, it also promotes undesirable gas bubble formation in the fuel of the fuel supply system. Gas bubbles tend to form in the fuel when the fuel is heated to a certain temperature. Providing the high-pressure fuel pump in the vapor separator causes heat emitted from the pump to be transferred to the fuel, especially when the fuel flows through the high-pressure pump. The location of the vapor separator next to the engine in the powerhead exacerbates this problem because heat emitted by the engine is also transferred to the fuel. This heated fuel is susceptible to the formation of gaseous bubbles in the liquid fuel.

Gaseous bubbles are undesirable in the liquid fuel because they reduce the amount of liquid fuel introduced to the engine. Charge formers are typically designed to deliver fuel for a predetermined period of time or a predetermined volume of fuel. Gaseous bubbles in the liquid fuel affect the actual amount of liquid fuel that is delivered by the charge formers. Thus, gaseous bubbles in the liquid fuel affect the air/fuel ratio in the engine. The greater the concentration of the gaseous bubble in the liquid fuel, the less liquid fuel the charge formers actually deliver to the engine and the leaner the air/fuel ratio of the charge delivered to the engine.

The concentration of the gaseous bubbles in the liquid fuel is also unpredictable. This makes it difficult to adjust the timing of the charge formers to account for gaseous bubbles in the fuel. Because the gaseous bubbles in the fuel affect the amount of fuel introduced to the engine, an inconsistent concentration of gaseous bubbles also causes an inconsisten air/fuel ratio in the engine, causing inconsistent engine performance.

SUMMARY OF THE INVENTION

One aspect of the present invention lies in recognizing that the formation of gaseous bubbles in the liquid fuel of the fuel supply system is inhibited by cooling the liquid fuel. Thus, a need therefore exists for a fuel supply system cooling arrangement that removes heat from at least a portion of the fuel supply system.

Another aspect of the present invention involves an engine for a marine drive that includes an internal combustion and a fuel supply system. The fuel supply system includes at least one charge former which supplies a fuel charge to the internal combustion engine. A cooling system is provided for the fuel supply system that removes heat from at least a portion of the fuel supply system.

An additional aspect of the present invention involves an engine that includes an internal combustion engine and a fuel supply system. The fuel supply system includes at least one charge former which supplies a fuel charge to the internal combustion engine and a vapor separator that is in fluid communication with the at least one charge former. The vapor separator assembly includes a housing that defines an enclosed fuel tank which holds fuel. A fuel pump is at least partially contained within the housing and delivers fuel from the vapor separator to the at least one charge former. A cooling system is provided for the vapor separator that removes heat from the vapor separator.

A further aspect of the invention involves an outboard motor that includes a powerhead with an internal combustion engine and a protective cowling that surrounds the engine. The cowling has an air inlet which allows air to flow into the powerhead. An induction system is provided for the internal combustion engine. The induction system includes an air inlet which receives the air from the cowling air inlet. A fuel supply system is carried by the outboard motor and includes a vapor separator assembly. The vapor separator assembly includes a housing that defines an enclosed fuel tank which holds fuel. A fuel pump is at least partially contained within the housing. The vapor separator is positioned between the cowling air inlet and the induction system air inlet so that it lies within the air flow between the cowling air inlet and induction system air inlet.

BRIEF DESCRIPTION OF THE DRAWINGS

These and other features of the invention will now be described with reference to the drawings of preferred embodiments of the invention which are intended to illustrate and not to limit the invention, and in which.

DETAILED DESCRIPTION OF PREFERRED EMBODIMENTS

Figure 1:
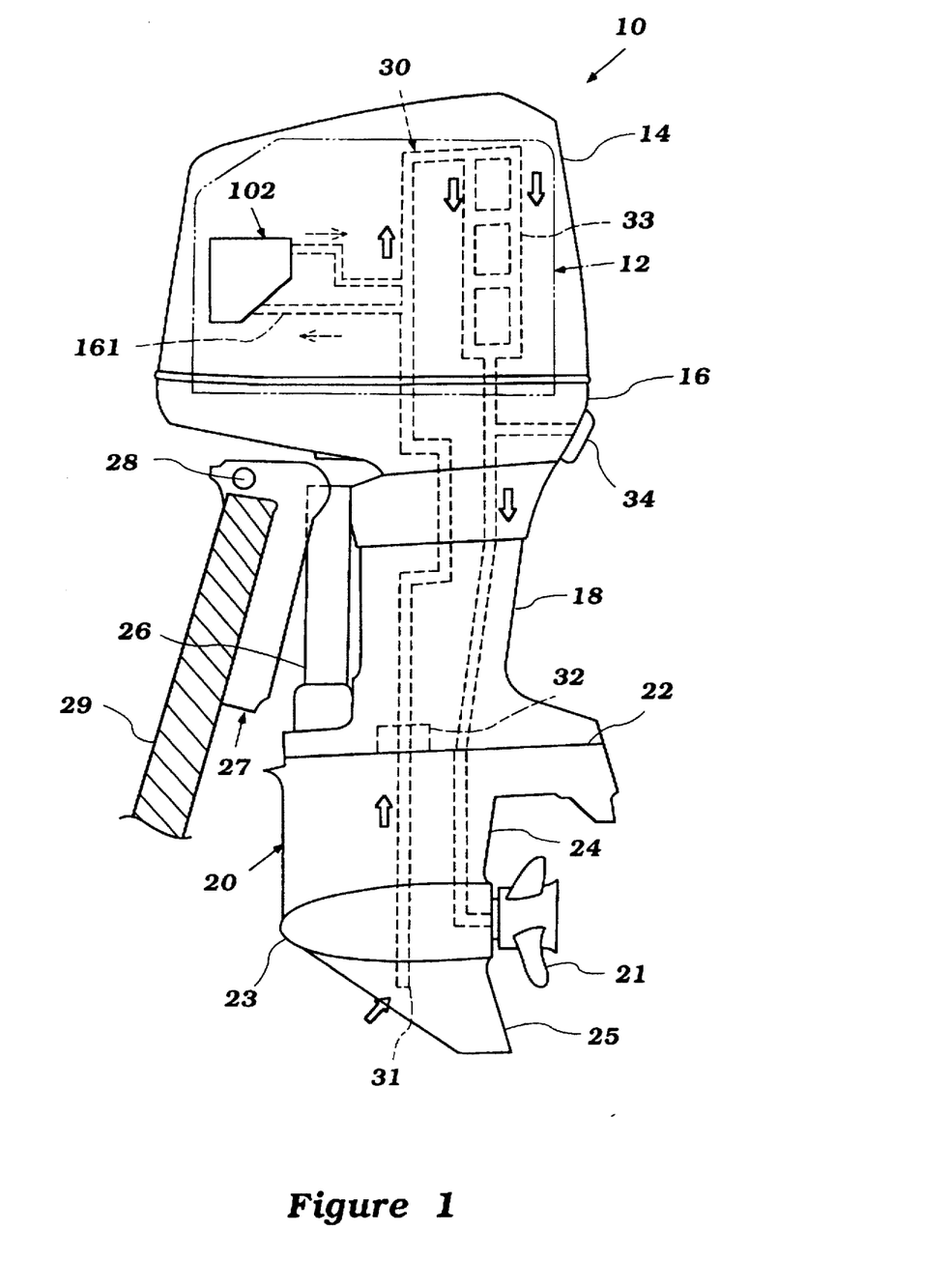
FIG. 1 is a schematic, side elevational view of an outboard motor including a fuel supply system constructed in accordance with a preferred embodiment of the invention illustrating a cooling system in hidden lines.

FIG. 1 illustrates an outboard drive 10 that incorporates a cooling arrangement for a fuel supply system that is configured in accordance with the present invention. The cooling arrangement has particular utility for a fuel supply system of an outboard motor engine; however, the depiction of the invention in conjunction with an outboard motor engine is merely exemplary. Thus, those skilled in the art will readily appreciate that the present invention can be used with engines of other types of marine drives, such as, for example, an inboard motor of an inboard/outboard drive, an inboard motor of a personal watercraft, and other types of engines as well.

The outboard motor 10 includes a powerhead that comprises a powering internal combustion engine 12 (FIG. 2) and a surrounding protective cowling. The cowling includes a main cowling portion 14 that is detachably connected to a tray portion 16.

As is typical with outboard motor practice, the engine 12 is supported within the powerhead so that its output shaft or crankshaft 17 (FIG. 2, 3) rotates about a vertically extending axis. This output shaft or crankshaft is rotatably coupled to a drive shaft (not shown) that depends into and is journaled within a drive shaft housing 18. The tray portion 16 encircles the upper portion of the drive shaft housing 18. The drive shaft continues into a lower unit 20 where it is selectively coupled to a propulsion device in a selected forward, neutral, or reverse operating condition so as to propel an associated watercraft.

The lower unit 20 is separated from the drive shaft housing housing 18 by a horizontally extending plate 22. The lower unit 20 includes an nacelle 23 that houses the propeller shaft and is connected to the drive shaft housing 18 by a strut 24. A slag 25 is provided on the lower side of the nacelle 23.

A steering shaft (not shown) is journaled within a swivel bracket 26 for steering the outboard motor about a vertically extending axis defined the steering shaft. The swivel bracket 26 is, in turn, connected to a clamping bracket 27 by a trim pin 28 for tilt and trim operation of the outboard motor 10 about a generally horizontally extending tilt axis defined by the trim pin 28. The clamping bracket 27 is mounted to a transom 29 of the associated watercraft.

As illustrated schematically in FIG. 1, the outboard motor 10 is equipped with a coolant delivery system, indicated generally by the reference numeral 30, for cooling the engine 12. The cooling system 30 includes a water inlet 31 located in the slag 25 of the lower unit 20. A water pump 32 is mounted to the horizontally extending plate 22 and draws water from the body of water in which the watercraft is operating through the inlet 31 and a water conduit. The water pump 32, which is driven by the drive shaft, pumps water upwardly through the water conduit to an engine cooling jacket that is schematically by the reference numeral 33. The cooling water is circulated in a desired flow pattern through the cooling jacket 33 of the engine 12 and is discharged through a water conduit back into the drive shaft housing 18. In the drive shaft housing 18 the cooling water is desirably merged with exhaust gases from the engine 12 in a well known manner. The cooling water cools and silences the exhaust gases and returns with the exhaust gases to the body of water in which the watercraft is operating. A portion of the cooling water may also be diverted to a tell-tale port 34 located at a rear part of the lower tray 16 to indicate whether the engine cooling system 30 is operating.

In order to facilitate the description of the present invention, the terms "front" and "rear" are used herein. "Front" refers to that side closest to the transom 29 of the watercraft, while "rear" refers to that side away from the transom 29.

Figure 2:
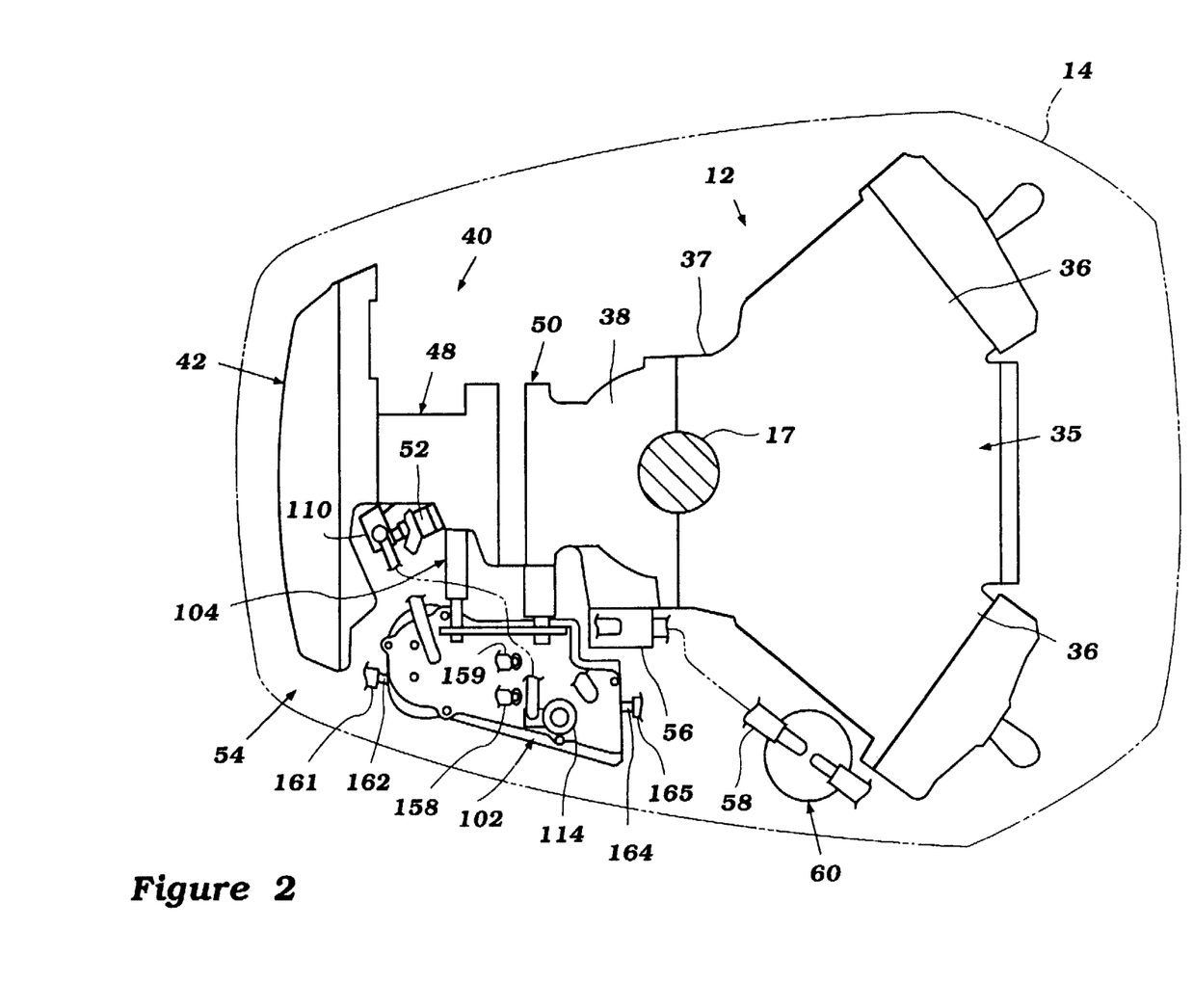
FIG. 2 is a plan view of the power head of the outboard motor of FIG. 1 illustrating the fuel supply system of the outboard motor.

As illustrated in FIG. 2, the engine 12 is a reciprocating multi-cylinder engine operating on a two-cycle crankcase compression principle. The engine 12 has a V-type configuration, though it will be readily apparent to those skilled in the art how the invention may be utilized with engines having other cylinder arrangements, such as, for example, in-line or slant cylinder arrangements, and operate on other than a two-cycle crankcase compression principle, such as, for example, a four-cycle principle.

The engine 12 includes a cylinder block assembly 35 that lies generally within the center of the powerhead. The cylinder block 32 includes a pair of inclined cylinder banks 36 which extend at an angle relative to each other to give the engine a conventional V-type configuration. Pistons (not shown) reciprocate within the cylinder banks 36 so as to rotate the crankshaft 17 in a well known manner.

The crankshaft 17 is rotatably journaled within a plurality of crankcase chambers that are sealed from one another in a well known manner. The crankcase chambers are formed by a skirt 37 of the cylinder block 32 and a crankcase member 38 that is affixed to the cylinder block 32 in any well-known manner.

Figure 3:
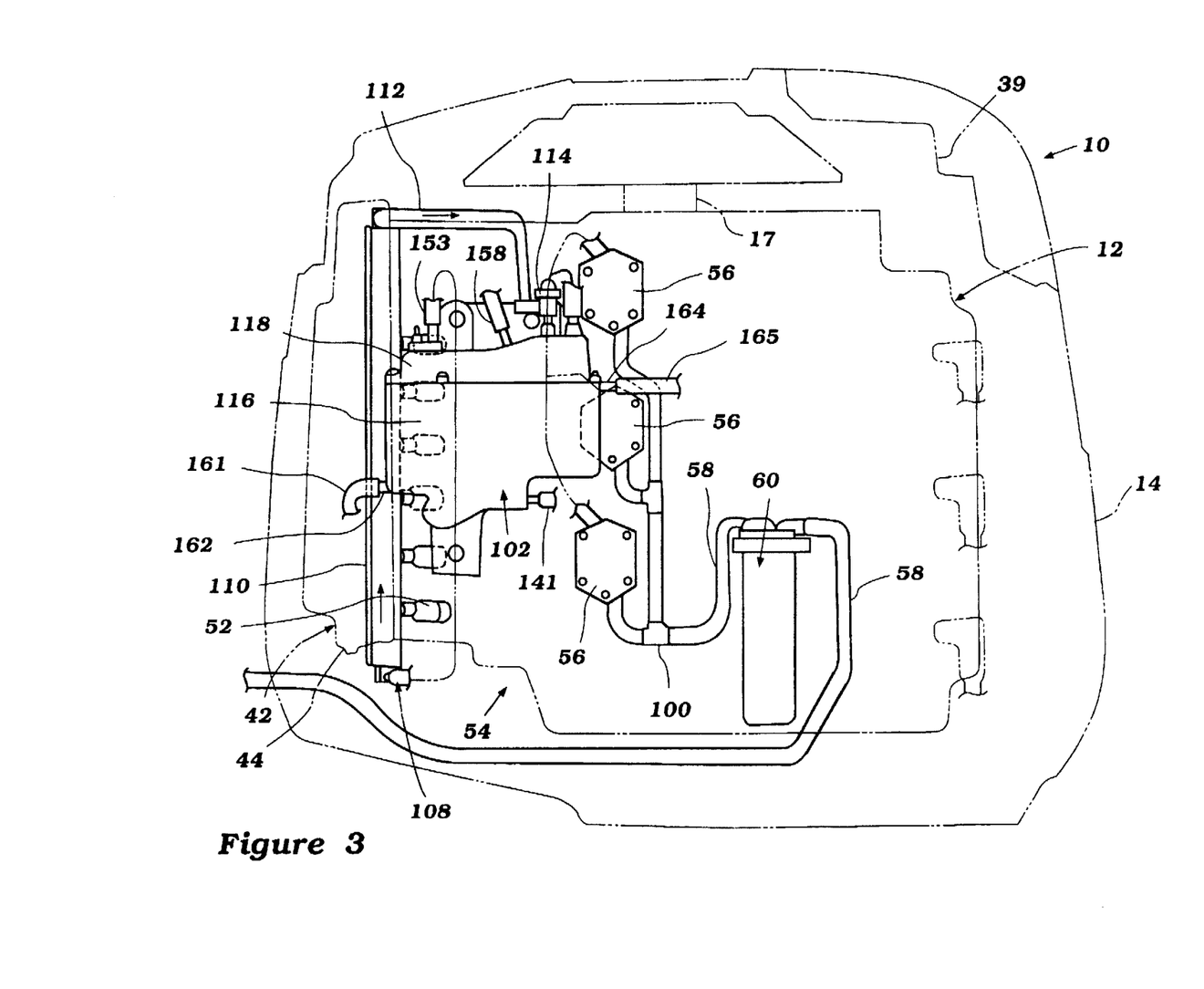
FIG. 3 is a port side, side elevational view of the power head of FIG. 2.

As is typical with two-cycle crankcase compression engines, the crankcase chambers receive a supply of air in a manner that will now be described. With reference to FIG. 3, ambient air flows into the cowling 14 through an air inlet opening 39. Baffles (not shown) are provided to in the cowling 14 adjacent to the air inlet opening 39 for inhibiting water flow into the engine compartment. As is known in the art, the inlet opening 39 also functions as a handle for raising and lowering the outboard motor 10. Air flows through the engine compartment to an induction system that is indicated generally by the reference numeral 40. The induction system 40 includes an intake silencer 42 with a downwardly facing air inlet 44 which disposed near the front of the power head. The intake silencer 42 draws air from the engine compartment and silences the intake air charge.

The induction system 40 includes a number of adjacent throttle body assemblies 48 to which the air charge is then delivered. Each throttle body assembly 48 includes a housing with a butterfly-type throttle valve for regulating the air flow through the throttle body assembly 48. An intake housing 50 is provided between the throttle body assembly 48 and the crankcase member 38. The throttle body assembly 48, intake housing 50 and front end of the crankcase member 38 together comprise an intake passage which delivers atmospheric air to each crankcase chamber. A reed-type check valve (not shown) is disposed in each intake passage adjacent to the respective crankcase chamber and operates to preclude reverse air flow in a well-known manner.

Fuel is supplied to the air charge in each intake passage by a fuel injector 52 that is mounted within the throttle body assembly 48 downstream of the butterfly-type valve.

The fuel injector 52 receives a supply of fuel from a fuel supply system, indicated generally by the reference numeral 54. The fuel supply system 54 includes a supply fuel tank (not shown) that is mounted within the hull of the associated watercraft. As illustrated in FIGS. 2 and 3, a plurality of low-pressure fuel pumps 56 positioned along the side of the crankcase chambers draw fuel from the supply tank through a supply line 58. The supply line 58 includes a plurality of supply conduits.

Figure 4:
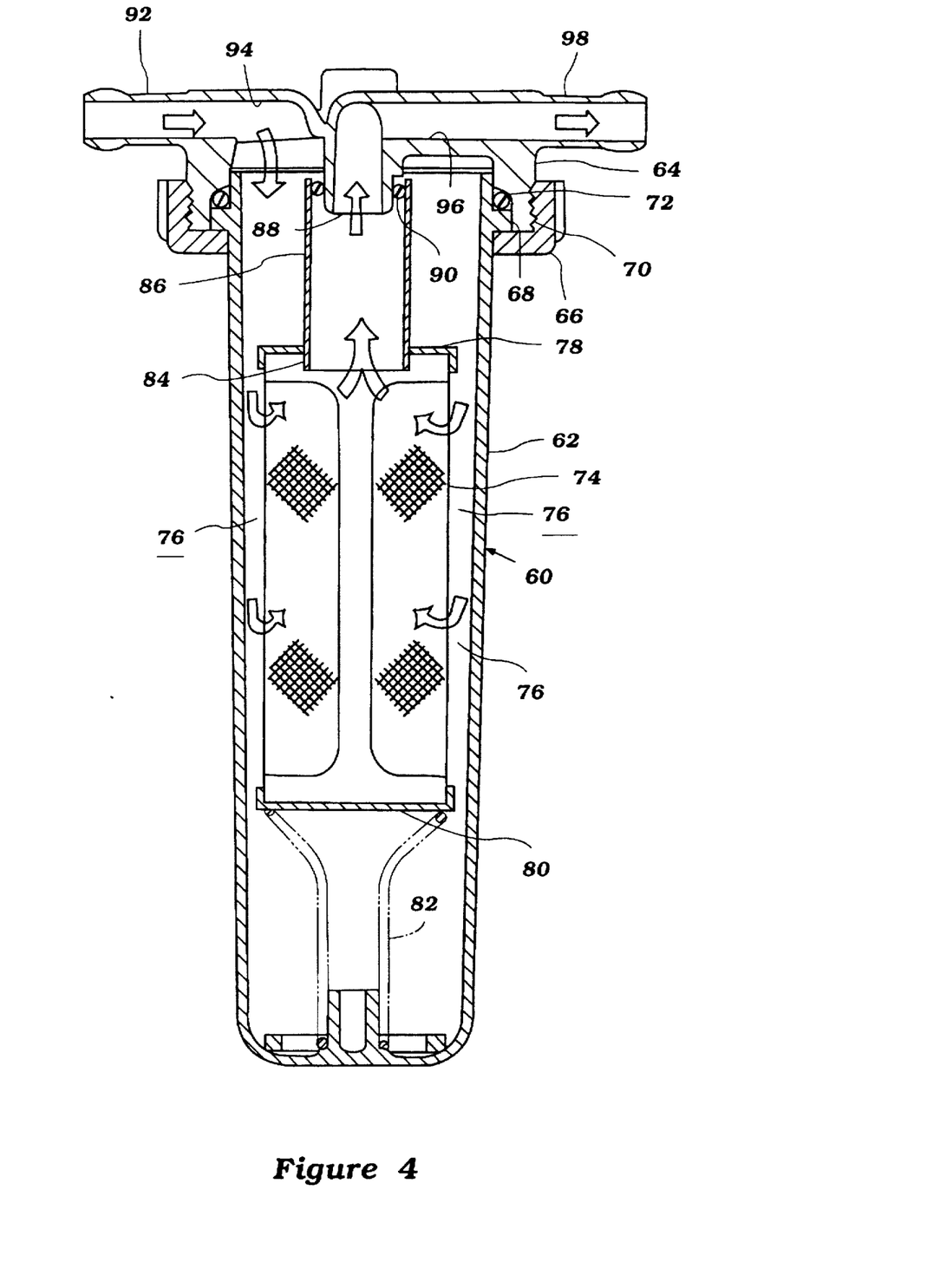
FIG. 4 is an enlarged cross-sectional view of a fuel filter of the fuel supply system shown in FIGS. 2 and 3.

With reference to FIGS. 2–4, and especially to FIG. 4, the supply line 58 includes a fuel filter 60 located between the low-pressure fuel pumps 56 and the supply tank. The fuel filter 60 includes a generally cylindrical casing 62 that is affixed to a cap 64 by means of a coupling 66. The coupling 66 cooperates with a flange 68 formed on the upper end of the casing 62 and is threaded onto a threaded portion 70 of the cap 64 for securing the elements together. An O-ring seal 72 is provided at the joint between the flange 68 and an inner part of the threaded portion 70 of the cap 64 so as to provide a fluid tight seal.

A generally cylindrical filter element 74 is contained within an internal reservoir 76 formed within the casing 62. The filter element 74 includes an upper end 78 and a lower end 80. The lower end 80 of the filter 74 is supported by a base 82. An opening 84 is provided in the upper end 78 of the filter element 74. A connecting 86 is provided between the opening 84 of the upper end 78 and an inlet 88 of the cap 64. An O-ring seal 90 is provided between an upper part of the connecting member 86 and the inlet 88. The filter element 74 is preferably of the hydrophobic type so that it will separate water from the fuel that flows through it. This separated water will accumulate at the bottom of the casing 62 and may be periodically removed.

Fluid flows into the filter 60 through an inlet fitting 92 of the cap 64. The inlet fitting 92 communicates with an inlet passage 94 for delivering fuel to the reservoir 76. As fuel is drawn through the filter element 74, water and other contaminates are separated from the fuel. Fuel then flows into the inlet 88 of the cap 64 and is discharged from the filter 60 through a discharge passageway 96 and a discharge fitting 98 of the cap 64. The inlet fitting 92 and discharge fitting 98 communicate with the supply conduits of the supply line 58.

Between the fuel filter 60 and the multiple low-pressure fuel pumps 56, the supply line 58 includes multiple connectors 100 that branch the single conduit that leads from the fuel filter 60 to multiple conduits that lead to the multiple low-pressure fuel pumps 56.

The low-pressure fuel pumps 56 pump the fuel from these multiple conduits to a vapor separator assembly, indicated generally by the reference numeral 102. The vapor separator 102 is provided on the port side of the power head in the air flow path between the air inlet opening 39 of the cowling 14 and the air inlet 44 of the intake silencer 42 for cooling purposes. The vapor separator 102 is mounted to the throttle bottle assembly 48 and intake housing 50 by a mounting arrangement 104, which extends from the throttle bottle assembly 48 and intake housing 50.

Figure 6:
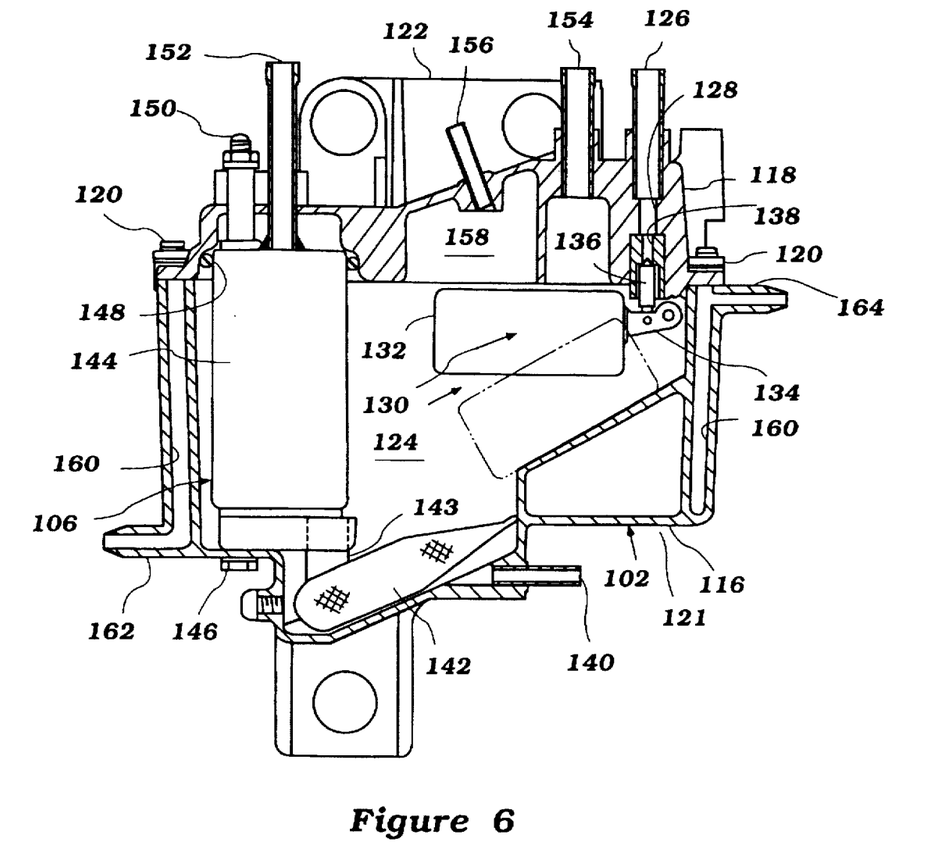
FIG. 6 is a side, cross-sectional view of the vapor separator of FIG. 5.

As illustrated in FIG. 6, the vapor separator 102 includes a high-pressure fuel pump 106 located substantially within the vapor separator 102. The high-pressure fuel pump 106 pumps fuel from the vapor separator 102 through a delivery line 108 to a fuel rail 110. The fuel rail 110 is elongated and preferably extends in the vertical direction. The fuel injectors 52 receive high-pressure fuel from the fuel rail 110.

A fuel return line 112 extends between an outlet of the fuel rail 110 and the vapor separator 102. The return line 112 completes a fuel flow loop that generally maintains a constant flow of fuel to the fuel rail 110. The constant fuel flow inhibits heat transfer to the fuel and, thus, reduces fuel vaporization in the fuel supply system 54. The fuel return line 112 includes a pressure regulator 114 adjacent to the vapor separator 102 for maintaining a uniform fuel pressure at the injectors 52. The regulator 114 regulates the fuel pressure by dumping excess fuel back to the vapor separator 102 in a well know manner.

Figure 5:
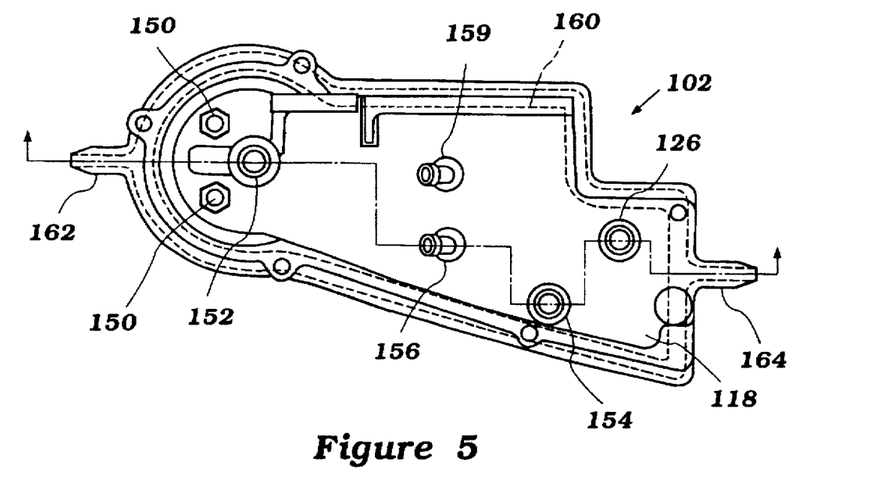
FIG. 5 is a top plan view of a vapor separator of the fuel supply system shown in FIGS. 2 and 3 constructed in accordance with an embodiment of the invention.

With reference to FIGS. 5 and 6, the vapor separator assembly 102 of the present invention will now be described in more detail. The vapor separator 102 includes a bowl 116 and a cover 118 that is affixed to the bowl 116 by a plurality of bolts 120. Together, the bowl 116 and cover 118 form a vapor separator housing 121. The vapor separator 102 includes a mounting bracket 122 formed integrally with an inner wall of the housing for mounting the vapor separator 102 to the mounting arrangement 104. Together, the cover 118 and bowl 116 define a fuel tank or internal cavity 124 which receives a supply of fuel from the low-pressure fuel pump 56 through a supply conduit of the supply line 58.

The supply line conduit 58 sealingly engages a fuel supply inlet port 126. The fuel supply inlet port 126 is integrally formed with the cover 118 and communicates with a fuel inlet passage 128. The fuel inlet passage 128 opens to the internal cavity 124, permitting the ingress of fuel into the bowl 116.

The level of fuel within the cavity 124 is controlled by a flow-type metering system 130 disposed within the cavity 124. The metering system 130 includes a float 132 that is rigidly affixed to a pivot arm 134 which is, in turn, pivotally connected to a bottom surface of the cover 118. A needle valve 136 is disposed atop the pivot arm 134 and extends upwardly towards a constricted portion 138 (i.e., valve seat) of the fuel inlet passage 128.

As fuel is pumped into the cavity 124 by the low-pressure fuel pumps 56, the level of the fuel within the bowl 116 rises. This causes the float 132 to rise which, in turn, causes the needle valve 136 to extend further upward towards the constricted portion 138 of the fuel inlet passage 128. Once the fuel in the bowl 116 is at a predetermined desired level, the needle valve 136 will be disposed within the passage 128 so as to impinge against the constricted portion 138 to prevent any further fuel flow into the bowl 116. When the fuel level drops, the needle valve 136 no longer contacts the constricted portion 138 and fuel flows past the needle valve 136 into the cavity 124.

As is well known in the marine engine art, it is desirable to mix oil with the fuel in a two-cycle engine. To this end, an oil inlet port 140 is integrally formed within the bottom of the bowl 116 for supplying oil to the fuel in the vapor separator 102. The oil inlet port 140 opens to the cavity 124 and sealingly engages an oil conduit 141 (FIG. 3) from an oil supply system.

A strainer 142 is disposed at the bottom of the bowl 116 adjacent to the oil inlet port 140. The high-pressure fuel pump 144 draws fuel into the pump 144 through the strainer 142 and influent port 143. The strainer 142 strains any remaining impurities from both the oil and the fuel as the fuel and oil are drawn from the bowl 116.

The fuel pump 144 has an external casing that is disposed substantially within the cavity 124. The fuel pump 144 is affixed at its lower end by a threaded fastener 146. The upper end of the fuel pump 144 is sealingly engaged with a lower surface of the cover 118 by an O-ring seal 148. The fuel pump 144 includes a pair of electric terminals 150 at its upper end that extend upwardly through the cover 118 and are coupled to electrical wires that lead from a control unit circuit or electrical source (e.g., a battery or generator) for supplying electrical power to a rotary motor of the pump 144. The pump also includes a discharge port 152 at its upper end that extends upwardly through the cover 118. The discharge port 152 sealingly engages a conduit 153 of the delivery line 108.

A fuel return inlet port 154 is integrally formed within the cover 118 adjacent to the fuel inlet port 126 and opens to the cavity 124. The pressure regulator 114 dumps fuel into the vapor separator 102 through this port 154 for regulating the fuel pressure at the fuel injectors 52.

A vapor vent port 156 is integrally formed within the cover 118 adjacent to the return inlet port 154 and opens to a vapor cavity 158 formed in the uppermost portion of the cavity 124. A conduit 158 (FIG. 3) sealingly engages the vapor vent port 156 and desirably terminates at the induction system 40 of the engine 12. Fuel vapors and other gases rise from the fuel in the bowl 116 into the vapor cavity 158 and are routed by the conduit 158 to the induction system in a conventional manner.

As illustrated in FIG. 5, an oil return port 160 is disposed within the cover 118 in side-by-side relationship with the vapor vent port 156 and returns oil from the engine 12 through a conduit 162 (FIG. 2) to the vapor separator assembly 102.

To cool the fuel in the vapor separator 102 so that gaseous bubble formation in the liquid fuel is inhibited, the housing 121 of the vapor separator 102 includes a cooling jacket 160 at its periphery. With reference to FIG. 1, cooling water from the engine cooling system 30 is diverted through a cooling delivery line 161 before it enters the engine cooling jacket 33 and is supplied to the vapor separator cooling jacket 160 (FIGS. 2, 3). The cooling delivery line 161 sealingly engages a cooling jacket inlet port 162. The cooling water flows through the jacket 160 and exits the jacket 160 at a cooling jacket outlet port 164. A cooling return line 165 sealingly engages the outlet port 164 and returns the water to the engine cooling system.

In the following embodiment, many of the components of the outboard motor 10 are similar to those described above. Accordingly, the following description uses the same reference numerals to indicate like components between the embodiments, but with each embodiment using a different suffix letter. It is intended, unless indicated otherwise, that the first description of a component applies equally to a similar component in the following embodiment for brevity.

Figure 7:
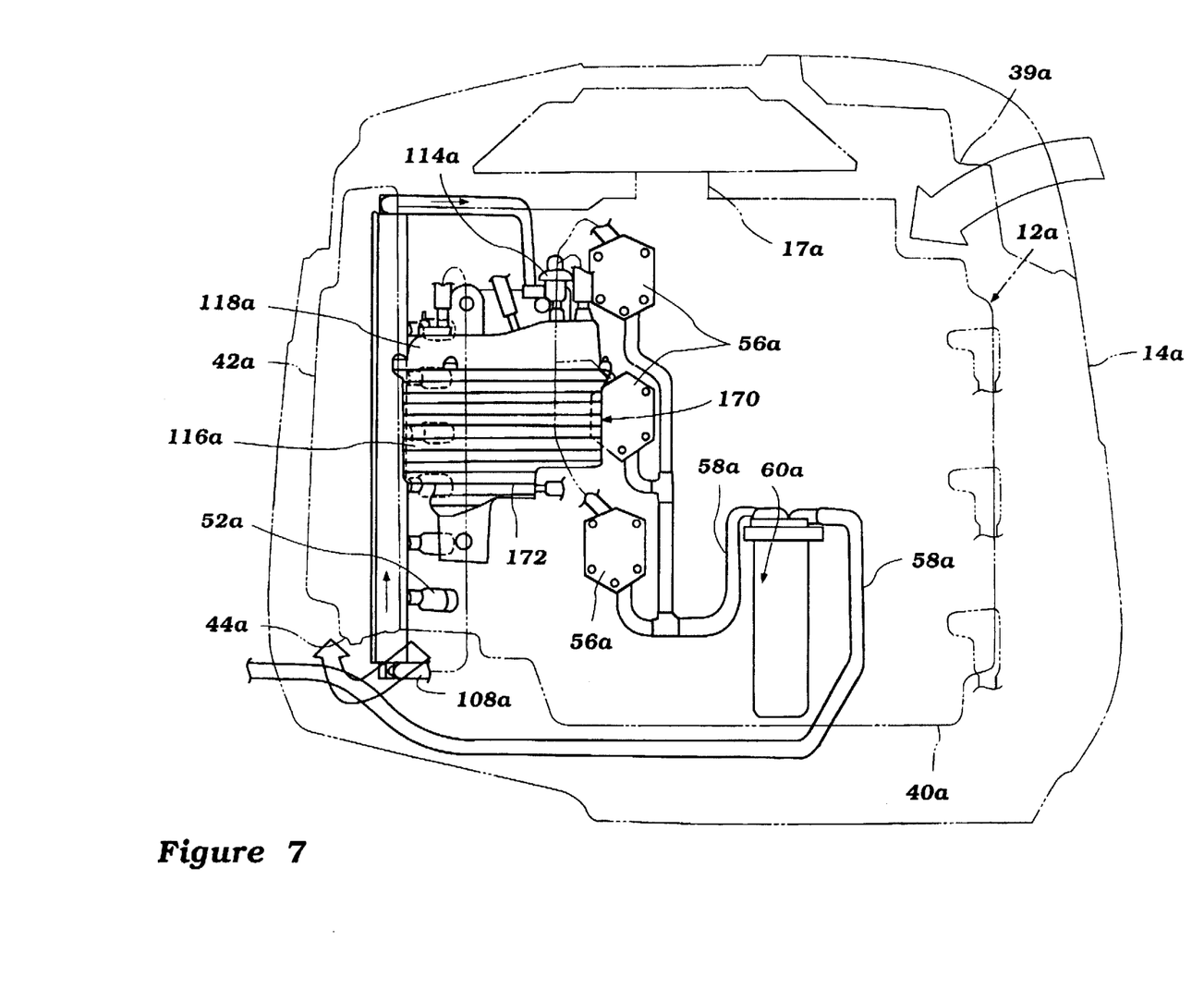
FIG. 7 is a port side, side elevational view of the power head of the outboard and shows a fuel supply system constructed in accordance with another embodiment of the invention.
Figure 8:
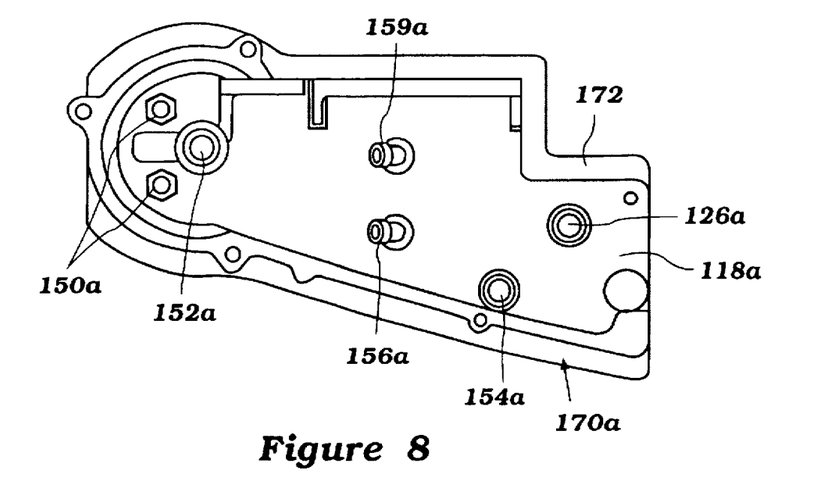
FIG. 8 is a top plan view of a vapor separator shown of the fuel supply system of FIG. 7.
Figure 9:
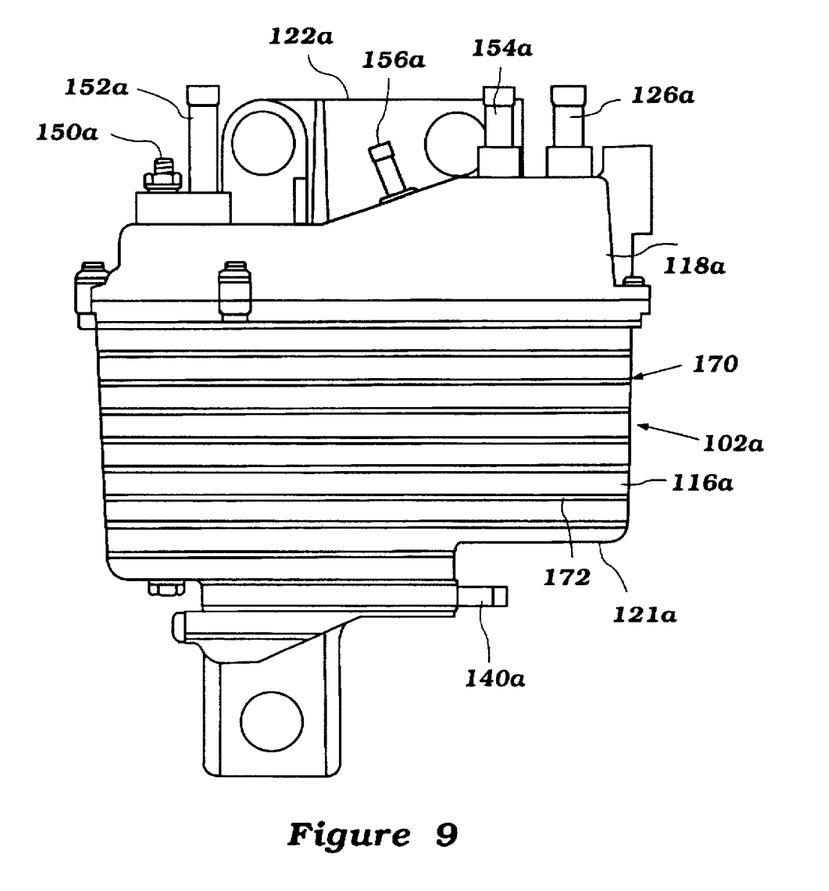
FIG. 9 is a side view of the vapor separator of FIG. 8.

FIGS. 7–9 illustrate a vapor separator 102a constructed in accordance with an additional embodiment of the invention. The vapor separator 102a is identical to the vapor separator 102 of FIGS. 1–3 and 5–6 except the cooling jacket 160 and related components are replaced with a cooling fin assembly 170. The cooling fin assembly 170 includes a plurality of parallel cooling fins 172 spaced a predetermined distance apart that extend laterally from the outer periphery of the bowl 116a. The cooling fins 172 dissipate heat in a well known manner. Dissipating heat causes the fuel of the vapor separator 102a to be cooled to a temperature where air bubble formation in the fuel is inhibited.

Similar to the vapor separator 102 described above, the vapor separator 102a is positioned between the air inlet opening 39a of the cowling 14a and the air inlet 44a of the intake silencer 42a so as to lie within the air flow between the cowling air inlet 39a and intake silencer air inlet 44a. As shown by the arrows in FIG. 7, ambient air flows through the air inlet opening 39a and into the engine compartment. This air flows in an air flow path past the vapor separator 102a and into the air inlet 44a of the silencer 42a. This flow of air over the surface of the vapor separator 102a and cooling fins 172 causes convective cooling of the vapor sepator 102a. As a result, heat is removed from the fuel in the vapor separator 102a and gaseous bubble formation in the liquid fuel is inhibited.

The above-described cooling arrangements for the vapor separator of the fuel supply system inhibit the development of gaseous bubbles in the liquid fuel of the vapor separator and high-pressure fuel pump of the fuel supply system by cooling the liquid fuel. Inhibiting gaseous bubble formation is desirable because gaseous bubbles in the liquid fuel delivered to the fuel injectors prevents the fuel injectors from delivering a sufficient amount of liquid fuel to the engine. Inhibiting gaseous bubble formation is also important because the concentration of gas bubbles in the liquid fuel is unpredictable and the fuel injectors can not adjusted to account for gaseous bubbles in the liquid fuel. An inconsistent concentration of gaseous bubbles in the liquid fuel causes an air/fuel charge with an inconsistent air/fuel ratio to be introduced to the engine. This causes the engine to run inconsistently. By cooling the liquid fuel in the fuel supply system, the above-described cooling arrangements for the fuel supply system inhibit the formation of gaseous bubbles in the liquid fuel. This causes the fuel injectors 52 deliver an optimal and consistent fuel charge to the engine, resulting in consistent, optimal engine performance.

What is claimed is:

1. An outboard motor comprising an internal combustion engine with a protective cowling that surrounds said internal combustion engine, a fuel supply system including at least one charge former which supplies a fuel charge for the internal combustion engine, a cooling system juxtaposing at least a portion of said fuel supply system and including at least one cooling fin, an air inlet provided in said protective cowling, an induction system provided for said internal combustion engine, said induction system including an air inlet which receives air from said cowling air inlet, and said vapor separator positioned between the cowling air inlet and the induction system air inlet so as to lie within the air flow between the cowling air inlet and induction system air inlet.

2. The outboard motor of claim 1, wherein said fuel supply system includes a vapor separator assembly having a housing that defines an enclosed fuel tank which holds fuel, a fuel pump at least partially contained within said housing, and said at least one cooling fin is provided on said housing.

3. An outboard motor comprising an internal combustion engine, a fuel supply system including at least one charge former which supplies a fuel charge to said internal combustion engine and a vapor separator assembly in fluidic communication with said at least one charge former, said vapor separator assembly having a housing that defines an enclosed fuel tank which holds fuel, a fuel pump being at least partially contained within said housing and at least partially positioned within the fuel tank so as to deliver fuel from said vapor separator assembly to said at least one charge former, a cooling system including a cooling jacket in contact with at least a portion of the housing and juxtaposing at least part of the fuel pump contained within the housing so as to remove heat from said vapor separator tank and fuel pump, and a protective cowling that surrounds said engine and fuel supply system.

4. The outboard motor of claim 3, wherein said protective cowling includes an air inlet, and the engine includes an induction system, said induction system including an air inlet which receives air from said cowling air inlet, and said vapor separator is positioned between the cowling air inlet and the induction system air inlet so as to lie within the air flow between the cowling air inlet and induction system air inlet.

5. The outboard motor of claim 3, wherein said internal combustion engine includes a fluid cooling system which reduces engine heat, and said cooling jacket of the fuel supply system's cooling system is connected to the engine fluid cooling system to receive cooling fluid from the engine fluid cooling system.

6. The outboard motor of claim 3, wherein said cooling system includes a plurality of cooling fins provided on said housing.

7. An outboard motor comprising a powerhead having an internal combustion engine and a protective cowling which surrounds the engine, said cowling having an air inlet which allows air to flow into the powerhead, an induction system provided for said internal combustion engine, said induction system including an air inlet which receives said air from said cowling air inlet, a fuel supply system carried by said outboard motor, said fuel supply system including a vapor separator assembly having a housing that defines an enclosed fuel tank which holds fuel, a fuel pump at least partially contained within said housing, and said vapor separator positioned between the cowling air inlet and the induction system air inlet so as to lie within the air flow between the cowling air inlet and induction system air inlet.

8. The outboard motor of claim 7, wherein said vapor separator includes a cooling system which removes heat from said vapor separator.

9. The engine of claim 8, wherein said cooling system includes a cooling jacket extending about at least a portion of said housing.

10. The engine of claim 9, wherein said internal combustion engine includes a fluid cooling system which reduces engine heat, and said cooling jacket of the fuel supply system's cooling system receives cooling fluid from the engine fluid cooling system.

11. The engine of claim 8, wherein said cooling system includes at least one cooling fin provided on said housing.

* * * * *